United States Patent Office 3,481,982
Patented Dec. 2, 1969

3,481,982
NOVEL PROCESS FOR PREPARING
QUATERNARY AMINE SALTS
George F. Hennion, South Bend, Ind., assignor to Eli Lilly
and Company, Indianapolis, Ind., a corporation of
Indiana
No Drawing. Filed Nov. 1, 1965, Ser. No. 505,950
Int. Cl. C07c 87/30, 85/04
U.S. Cl. 260—567.6       6 Claims

ABSTRACT OF THE DISCLOSURE

This invention relates to the reaction of a tertiary amine with a tertiary propargyl halide to obtain allenic ammonium halides of the formula

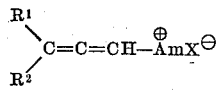

which have surface active properties and are therefore useful as wetting agents. $R^1$ and $R^2$ in the above compounds are lower alkyl, or together with the carbon to which they are attached, cycloalkyl or cycloalkenyl and Am is the residue of a tertiary amine which may be when taken together with the nitrogen atom a heterocyclic ring containing 5–8 atoms and no more than one additional hetero atom selected from sulfur or oxygen.

---

This invention relates to a process for preparing novel unsaturated quaternary ammonium salts. In particular this invention relates to a reaction between tertiary amines and tertiary propargyl halides to form certain unsaturated quaternary ammonium salts in one step.

Although it is well known that many primary, secondary, and tertiary amines will react with various alkyl halides to form stable ammonium salts, the reaction has never been applied to the combination of a tertiary amine with a tertiary halide. When treated with amines, tertiary alkyl halides normally undergo dehydrohalogenation, H. C. Whitmore, "Organic Chemistry," pp. 74 and 76, D VanNostrand Co., New York 1937.

It has now been found, however, that tertiary propargyl halides will combine with a great variety of tertiary amines to form unsaturated quaternary ammonium halides in one step. Also surprising is the fact that these unsaturated quaternary ammonium halides are mixtures of the normal substitution product of the tertiary amine on the propargyl halide and an isomeric rearrangement product therefrom. The rearrangement product apparently arises from a carbene intermediate and has the following structural formula:

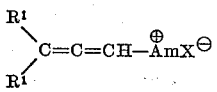

wherein:
$R^1$ and $R^2$, when taken separately, are $C_1$–$C_6$ alkyl;
$R^1$ and $R^2$, when taken together with the carbon atom to which they are attached, are $C_5$–$C_8$ cycloalkyl or $C_5$–$C_8$ cycloalkenyl;
Am is pyridine or

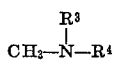

$R^3$ and $R^4$, when taken separately, are $C_1$–$C_6$ alkyl, $C_3$–$C_6$ alkenyl, $C_3$–$C_6$ alkynyl, phenyl-substituted lower alkyl, naphthyl-substituted lower alkyl, phenoxy-substituted lower alkyl, and naphthyloxy-substituted lower alkyl:

$R^3$ and $R^4$, when taken together with the nitrogen atom to which they are attached, are a heterocyclic ring containing from 5 to 8 atoms and containing no more than one additional hetero atom, said additional hetero atom being sulfur or oxygen; and X is a bromine or chlorine.

Therefore, reaction of a tertiary amine with a tertiary propargyl halide can be represented by the following structural equations:

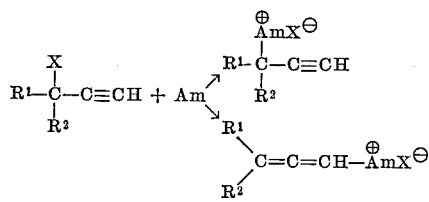

wherein $R^1$, $R^2$, Am, and X are as hereinabove defined.

$C_1$–$C_6$ alkyl can be illustratively methyl, ethyl, n-propyl, isopropyl, n-butyl, isobutyl, sec.-butyl, tert.-butyl, n-amyl, isoamyl, neo-pentyl, n-hexyl, 3-ethylbutyl, and the like.

$C_3$–$C_6$ alkenyl can be illustratively allyl, methallyl, 3-butenyl, 2-pentenyl, 1-ethyl-3-butenyl, and the like.

$C_3$–$C_6$ alkynyl can be illustratively propargyl, 2-butynyl, 5-hexynyl, and the like.

$C_5$–$C_8$ cycloalkyl can be illustratively cyclopentyl, cyclohexyl, cycloheptyl, cyclooctyl, methylcyclohexyl, ethylcyclopentyl, and the like.

$C_5$–$C_2$ cycloalkenyl can be illustratively 2-cyclopentenyl, 3 - cyclopentenyl, 3 - cyclohexenyl, 4 - cycloheptenyl, 3-methyl-4-cycloheptenyl, 5-cycloheptenyl, 2 - cyclooctenyl, 4-cyclooctenyl, and the like.

When $R^3$ and $R^4$, taken together with the nitrogen atom to which they are attached, comprise the members of a heterocyclic ring containing from 5 to 8 atoms it can be illustratively pyrroline, pyrrolidine, indole, thiazoline, thiazolidine, oxazoline, oxazolidine, pyrrole, morpholine, piperidine, oxazine, piperazine, azepine, homomorpholine, homopiperazine, and the like.

It will be apparent to those skilled in the art that the defined reaction proceeds in cases where the reacting species are not sterically hindered in such a manner as to be unable to undergo the bonding of the nitrogen atom to the carbon atom in the manner of the structural equations above.

While the compounds which may be used in the process of the present invention have been defined in terms of structural formulas which depict the structural features of the compounds and which indicate the presence therein of certain well-known organic radicals, including alkyl, alkenyl, alkynyl, cycloalkyl, cycloalkenyl, and certain heterocyclic radicals, it will be recognized by those skilled in the art that such radicals may themselves bear one or more substituents without requiring any significant modification of the process of the invention. The utilization of compounds bearing such substituents is accordingly to be considered to lie within the scope of the invention. Among such substituent atoms and radicals are halo, hydroxy, nitro, lower alkyl, trifluoromethyl, methoxy, methylmercapto, cyano, hydroxymethyl, β-hydroxyethyl, acetyl, acetamido, and the like.

The compounds prepared by the process of the present invention have surface-active properties and can therefore be used as wetting agents in a known manner.

The reaction of the present invention can be carried out by dissolving the two reacting species in a minimum amount of solvent, mixing the solutions, allowing the reaction to occur at an appropriate temperature for a sufficient time, and recovering the resulting quaternary salt product.

The reactant species may be dissolved in a suitable solvent, which can include hydroxylic and non-hydroxylic solvents, for example, water, methanol, ethanol, isopropanol, acetone, ether, pentane, hexane, benzene, cyclohexane, tetrahydrofuran, dihydropyran, and the like including mixtures of the above-named solvents. In general, a preferred solvent is one in which the reaction products, quaternary ammonium salts, are insoluble and thus can be removed by filtration, for example, acetone, ether, benzene, acetone - isopropanol, acetone - isopropanol - water, acetone-water, and the like. The reacting species can be dissolved in the same or different solvent systems. Commercial acetone containing from about 0.1 to about 2% isopropyl alcohol is a preferred solvent system.

The reaction generally can be carried out at a temperature of about −10 to about 70° C., with the range 20–35° C. generally preferred, as for example, ambient room temperature to the boiling point of ether. Reaction rates vary widely, the reaction being complete in some cases in about 1 hour, and in other cases in about 24–72 hours.

The crude product of the reaction can be isolated by filtration, vacuum distillation of the solvents, evaporation of the solvents, or like procedures known to those skilled in the art. In some instances, it is desirable or convenient to cool the crude reaction mixture to well below room temperature, for example 0° C. to −75° C. for a short period, during which time the reaction products will crystallize or separate from the solvent, and the solvent can thence be removed by decantation.

The crude reaction products, as isolated by the above techniques, are then purified by crystallization or recrystallization from an appropriate organic solvent or solvent mixture, as for example from acetone, acetonitrile, chloroform, ethyl acetate, ethanol, isopropyl alcohol, or an appropriate mixture of the above solvents.

It has also been found that catalytic quantities of a heavy metal or salt thereof will catalyze the above reaction. A preferred heavy metal salt is cuprous chloride, although mercury, silver, and similar salts are effective.

A typical reaction can be carried out as follows: to 0.1–0.25 mole of a tertiary amine in 50–100 ml. of pharmaceutical grade acetone containing 0.1 g. of cuprous chloride is added a solution of 0.12–0.3 mole of tert-propargylic chloride dissolved in 50–100 ml. of acetone. The reaction is allowed to stand for 12–72 hours depending upon the amount of precipitation of product. The product is isolated from the solvent by filtration, washed with fresh acetone, washed with ether, and dried. The crude product thus obtained is recrystallized from an appropriate solvent or mixture of solvents.

The invention is more clearly described by the following operating examples, which are not intended to limit the scope thereof in any way.

EXAMPLE I

Reaction of N,N-dimethylpropargylamine with 3-methyl-3-chloro-1-butyne

To 8.3 g. (0.1 mole) of N,N-dimethylpropargylamine in 50 ml. of acetone containing 0.1 g. of cuprous chloride were added 12 g. (0.12 mole) of 3-methyl-3-chloro-1-butyne. The solid product (11 g., 60% yield) was removed by filtration and was separated into two fractions by extraction with hot acetonitrile plus chloroform. The material soluble in this mixture was crystallized to yield material with M.P. 119–120° C. identified as 1-(N-methylpropargylamino)-3-methyl-1,2-butadiene methochloride by its infrared spectrum. The material insoluble in acetonitrile plus chloroform was crystallized from isopropyl alcohol plus ethyl acetate to yield material with M.P. 177–178° C. and with an infra-red spectrum which identified it as 3-(N-methylpropargylamino)-3-methyl-1-butyne methochloride. The components were determined to be present in the ratio of about 1:1 in the crude mixture from the proton magnetic resonance (p.m.r.) spectrum of this material.

3-(N-methylpropargylamino)-3-methyl-1-butyne methochloride. Melting point: 177–178° C. (dec.).

*Analysis.*—Calc. for $C_{10}H_{16}NCl$: C, 64.68; H, 8.69; N, 7.54. Found: C, 64.97; H, 8.93; N, 7.48.

1-(N-methylpropargylamino)-3-methyl-1,2-butadiene methochloride. Melting point: 119–120° C.

*Analysis.*—Calc. for $C_{10}H_{16}NCl \cdot \frac{1}{4}H_2O$: C, 63.14; H, 8.75; N, 7.36. Found: C, 63.06; H, 8.79; N, 7.16.

EXAMPLE II

Reaction of N,N-dimethylbenzylamine with 1-chloro-1-ethynylcyclohexane

A reaction was carried out as described above employing 13.5 g. (0.1 mole) of N,N-dimethylbenzylamine and 39 g. (0.12 mole) of 1-chloro-1-ethynylcyclohexane. The product (17.7 g., 64% yield) was isolated by filtration. The isomers were separated by extraction with hot acetonitrile. The material soluble in acetonitrile was crystallized from acetonitrile plus acetone to give material with M.P. 149–151° C. which was identified as β-(N-methylbenzylamino)-vinylidenecyclohexane methochloride by its infrared spectrum. The material insoluble in acetonitrile was crystallized from acetonitrile plus ethanol to yield material with M.P. 167–168° C. which was identified by its infra-red spectrum as 1-(N-methylbenzylamino)-1-ethynylcyclohexane methochloride. The isomers were determined to be present in approximately 1:1 ratio in the crude product from the p.m.r. spectrum of this material.

1-(N-methyl-N-benzylamino)-1-ethynylcyclohexane methochloride. Melting point: 175–176° C.

*Analysis.*—Calc. for $C_{17}H_{24}NCl \cdot \frac{1}{2}C_2H_5OH$: C, 71.85; H, 9.05; N, 4.66. Found: C, 71.83; H, 8.98; N, 4.50.

β-(N-methyl-N-benzylamino)vinylidenecyclohexane methochloride. Melting point 149–151° C.

*Analysis.*—Calc. for $C_{17}H_{24}NCl$: C, 73.49; H, 8.71; N, 5.04. Found: C, 73.39; H, 8.82; N, 4.84.

Additional compounds prepared by the above procedures include:

1-Piperidenyl-3-methyl-1,3-butadiene methochloride. Melting point: 151–153° C. (dec.).

*Analysis.*—Calc. for $C_{11}H_{20}NCl$: C, 65.49; H, 9.99; N, 6.94. Found: C, 63.63; H, 9.61; N, 6.07.

β-(N-Methylpropargylamino)vinylidenecyclohexane methochloride. Melting point: 133–135° C. (dec.).

*Analysis.*—Calc. for $C_{13}H_{20}NCl$: C, 69.16; H, 8.93; N, 6.20. Found: C, 69.02; H, 8.99; N, 5.94.

1-(N-methylbenzylamino)-3-methyl-1,2-pentadiene methochloride. Melting point: 145–146° C. (dec.).

*Analysis.*—Calc. for $C_{15}H_{22}NCl$: C, 71.55; H, 8.81; N, 5.56. Found: C, 71.65; H, 9.09; N, 5.44.

1-(methylbenzylamino)-3-ethyl-1,2-pentadiene methochloride. Melting point: 112–114° C.

*Analysis.*—Calc. for $C_{16}H_{24}NCl$: C, 72.29; H, 9.10; N, 5.27. Found: C, 72.40; H, 9.22; N, 5.18.

1-dimethylamino-3-ethyl-5-methyl-1,2-heptadiene methochloride. Melting point: 126–128° C.

*Analysis.*—Calc. for $C_{13}H_{26}NCl$: C, 67.35; H, 11.31; N, 6.04. Found: C, 67.32; H, 11.09; N, 5.98.

β-(Piperidinovinylidene)cyclohexane methochloride. Melting point: 144–147° C. (dec.).

*Analysis.*—Calc. for $C_{14}H_{24}NCl$: C, 69.54; H, 10.01; N, 5.79. Found: C, 69.18; H, 10.34; N, 5.52.

1-dimethylamino-3-ethyl-1,2-pentadiene methochloride. Melting point: 173–174° C. (dec.).

*Analysis.*—Calc. for $C_{10}H_{20}NCl$: C, 63.30; H, 10.63; N, 7.38. Found: C, 63.05; H, 10.75; N, 7.16.

I claim:

1. A method for preparing an allenic ammonium halide having the formula:

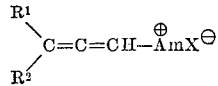

which comprises commingling an amine, Am, in approximately equimolar ratio with a tertiary propargyl halide having the formula:

$$R^1-\underset{R^2}{\overset{X}{C}}-C\equiv CH$$

at a temperature of about $-10°$ C. to $70°$ C. for a time sufficient to cause reaction thereof, wherein Am is $$CH_3-\underset{R^4}{\overset{R^3}{N}}$$

$R^1$ and $R^2$, when taken separately, are $C_1$–$C_6$ alkyl;
$R^1$ and $R^2$, when taken together with the carbon atom to which they are attached, are $C_5$–$C_8$ cycloalkyl or $C_5$–$C_8$ cycloalkenyl;
$R^3$ and $R^4$, when taken separately, are $C_1$–$C_6$ alkyl, propargyl, phenyl-substituted lower alkyl, naphthyl-substituted lower alkyl, phenoxy-substituted lower alkyl, or naphthyloxy-substituted lower alkyl;
$R^3$ and $R^4$, when taken together with the nitrogen atom to which they are attached, are morpholine, piperidine, oxazine, azepine, or homomorpholine; and
X is chlorine or bromine, to prepare a mixture of a quaternary propargyl amine and an allenic ammonium halide of the following formulas respectively:

$$R^1-\underset{R^2}{\overset{\overset{\oplus}{A}mX^\ominus}{C}}-C\equiv CH$$

and $$\underset{R^2}{\overset{R^1}{\diagdown}}C=C=CH-\overset{\oplus}{A}mX^\ominus$$

and isolating therefrom the allenic ammonium halide.

2. The method of claim 1 wherein said amine and said tertiary propargyl halide are commingled in acetone solution containing from about 0.1 to about 2 percent by volume of isopropyl alcohol.

3. The method of claim 1 wherein said amine and said tertiary propargyl halide are commingled in the presence of about 0.1 to about 2 percent by weight of a copper catalyst.

4. The method of claim 1 wherein said amine is N,N-dimethylpropargylamine and said tertiary propargyl halide is 3-chloro-3-methyl-1-butyne.

5. The method of claim 1 wherein said amine is s-collidine and said tertiary propargyl halide is 3-chloro-3-methyl-1-butyne.

6. The method of claim 1 wherein said amine is N,N-dimethylbenzylamine and said tertiary propargyl halide is 1-chloro-1-ethynylcyclohexane.

References Cited

UNITED STATES PATENTS

| | | | |
|---|---|---|---|
| 3,201,467 | 8/1965 | Oakes | 260—563 |
| 3,299,141 | 1/1967 | Croxall | 260—570.9 |
| 3,346,563 | 10/1967 | Shildneck et al. | 260—233.3 |

OTHER REFERENCES

Hennion et al., J. Org. Chem., vol. 30, pp. 3696–3698, November 1965.

Hennion et al., J. Org. Chem., vol. 31, pp. 1977–1978, June 1966.

Hennion et al., J. Am. Chem. Soc., vol. 70, pp. 2142–2145 (1957).

Chemical Abstracts, vol. 53, cols. 1199–1200 (1959).

JOHN D. RANDOLPH, Primary Examiner

U.S. Cl. X.R.

252—351; 260—239, 240, 247, 268, 293, 302, 307, 319.1, 326.8